US009485524B2

(12) United States Patent
Park et al.

(10) Patent No.: US 9,485,524 B2
(45) Date of Patent: Nov. 1, 2016

(54) METHOD, SYSTEM, AND APPARATUS FOR RECEIVING CONTENTS THROUGH MULTIPLE CHANNELS

(71) Applicant: KT CORPORATION, Seongnam (KR)

(72) Inventors: Ju-Won Park, Daejeon (KR); Dong-Il Kim, Daejeon (KR); Jaehyoung Yoo, Seoul (KR); Chan-Kyou Hwang, Daejeon (KR)

(73) Assignee: KT Corporation, Seongnam-si (KR)

( * ) Notice: Subject to any disclaimer, the term of this patent is extended or adjusted under 35 U.S.C. 154(b) by 644 days.

(21) Appl. No.: 13/667,643

(22) Filed: Nov. 2, 2012

(65) Prior Publication Data

US 2013/0110988 A1 May 2, 2013

(30) Foreign Application Priority Data

Nov. 2, 2011 (KR) ........................ 10-2011-0113293

(51) Int. Cl.
| | | |
|---|---|---|
| *G06F 15/16* | (2006.01) | |
| *H04J 1/16* | (2006.01) | |
| *H04J 3/14* | (2006.01) | |
| *H04N 21/222* | (2011.01) | |

(Continued)

(52) U.S. Cl.
CPC .......... *H04N 21/222* (2013.01); *H04N 21/238* (2013.01); *H04N 21/2665* (2013.01); *H04N 21/4622* (2013.01); *H04N 21/6373* (2013.01); *H04L 65/601* (2013.01); *H04L 65/602* (2013.01); *H04L 65/604* (2013.01); *H04L 65/605* (2013.01); *H04L 65/607* (2013.01); *H04L 65/608* (2013.01)

(58) Field of Classification Search
CPC ........... H04L 65/601–65/608; H04L 65/4076; H04L 43/00; H04L 63/0442; H04L 63/18; H04L 67/00–67/06; H04L 67/28; H04L 67/02; H04L 67/1002–67/1008; H04L 67/101–67/108; H04L 67/325; H04L 67/1029; H04L 67/1063; H04L 67/1085; H04L 67/2842; H04L 69/14–69/22; H04L 69/161–69/165; H04N 21/00; H04N 21/222; H04N 21/238; H04N 21/2665; H04N 21/6373; H04N 21/4622
USPC .......... 709/203–204, 213, 231; 370/229, 232
See application file for complete search history.

(56) References Cited

U.S. PATENT DOCUMENTS 5,751,716 A * 5/1998 Tzannes ............... H04L 27/2601
370/468
5,914,756 A * 6/1999 Maeda ................. G08B 27/006
348/553

(Continued)

FOREIGN PATENT DOCUMENTS

| KR | 10-0648659 B1 | 2/2006 |
|---|---|---|
| KR | 10-2011-0015898 A | 2/2011 |

*Primary Examiner* — Viet Vu
*Assistant Examiner* — Michael A Chambers
(74) *Attorney, Agent, or Firm* — Sughrue Mion, PLLC (57) ABSTRACT

An apparatus for receiving contents through multiple channels includes a content manager configured to receive, from multiple content providing servers through the multiple channels, multiple packet data related to appropriate contents which is suitable for a user device, and transmit the appropriate contents to the user device by using the received multiple packet data and a transmission rate manager configured to set each of reference transmission rate ranges of each of the multiple content providing servers, wherein the content manager is further configured to receive the multiple packet data from the multiple content providing servers based on the reference transmission rate ranges set by the transmission rate manager.

20 Claims, 8 Drawing Sheets

(51) Int. Cl.
*H04N 21/238* (2011.01)
*H04N 21/2665* (2011.01)
*H04N 21/462* (2011.01)
*H04N 21/6373* (2011.01)
*H04L 29/06* (2006.01)

(56) References Cited

U.S. PATENT DOCUMENTS

| | | | | |
|---|---|---|---|---|
| 5,999,224 A * | 12/1999 | Maeda | | G08B 27/006 348/553 |
| 6,018,371 A * | 1/2000 | Maeda | | G08B 27/006 348/553 |
| 6,028,644 A * | 2/2000 | Maeda | | G08B 27/006 348/553 |
| 6,031,578 A * | 2/2000 | Maeda | | G08B 27/006 348/553 |
| 6,037,996 A * | 3/2000 | Maeda | | G08B 27/006 348/553 |
| 7,092,999 B2 * | 8/2006 | Levitan | | H04H 20/86 375/E7.024 |
| 7,191,246 B2 * | 3/2007 | Deshpande | | H04L 1/0002 370/234 |
| 7,266,588 B2 * | 9/2007 | Oku | | G06F 17/30905 707/999.01 |
| 7,345,996 B2 * | 3/2008 | Imiya | | H04L 12/2602 370/229 |
| 7,418,494 B2 * | 8/2008 | Dahlin | | H04L 29/06 370/229 |
| 7,581,017 B2 * | 8/2009 | Hattori | | H04L 69/22 709/232 |
| 7,636,789 B2 * | 12/2009 | Li | | H04L 67/1085 709/231 |
| 7,656,799 B2 * | 2/2010 | Samuels | | H04L 12/24 370/231 |
| 7,873,740 B2 * | 1/2011 | Sitaraman | | H04L 29/06027 370/466 |
| 7,881,200 B2 * | 2/2011 | Lee | | H04L 1/0002 370/235 |
| 7,882,172 B2 * | 2/2011 | Kodaka | | H04L 12/24 345/3.1 |
| 7,929,481 B2 * | 4/2011 | Lundby | | H04W 52/16 370/318 |
| 8,135,844 B2 * | 3/2012 | Kikkawa | | H04L 29/06027 709/203 |
| 8,185,809 B2 * | 5/2012 | Luby | | H04L 69/14 709/228 |
| 8,260,951 B2 * | 9/2012 | Chen | | H04L 67/104 370/351 |
| 8,310,928 B2 * | 11/2012 | Samuels | | H04L 12/24 370/231 |
| 8,370,513 B2 * | 2/2013 | Kim | | H04L 12/2602 370/232 |
| 8,370,520 B2 * | 2/2013 | Kohli | | H04L 65/60 370/229 |
| 8,494,535 B2 * | 7/2013 | Lundby | | H04W 52/16 370/328 |
| 8,559,406 B2 * | 10/2013 | Lundby | | H04W 52/16 370/318 |
| 8,812,712 B2 * | 8/2014 | Balachandran | | G06F 15/16 709/203 |
| 8,839,270 B2 * | 9/2014 | Chen | | H04L 29/04 379/265.01 |
| 2002/0129159 A1 * | 9/2002 | Luby | | H04L 69/14 709/236 |
| 2002/0184630 A1 * | 12/2002 | Nishizawa | | G06F 1/1616 725/44 |
| 2003/0033425 A1 * | 2/2003 | Deshpande | | H04L 1/0002 709/233 |
| 2003/0081582 A1 * | 5/2003 | Jain | | H04B 7/18582 370/338 |
| 2004/0064577 A1 * | 4/2004 | Dahlin | | H04L 29/06 709/235 |
| 2004/0190452 A1 * | 9/2004 | Imiya | | H04L 12/2602 370/232 |
| 2004/0246924 A1 * | 12/2004 | Lundby | | H04W 52/16 370/332 |
| 2004/0267951 A1 * | 12/2004 | Hattori | | H04N 21/4305 709/231 |
| 2005/0063307 A1 * | 3/2005 | Samuels | | H04L 12/24 370/235 |
| 2005/0105471 A1 * | 5/2005 | Ido | | H04L 29/06 370/241 |
| 2005/0243849 A1 * | 11/2005 | Wentink | | H04L 1/0057 370/412 |
| 2006/0212531 A1 * | 9/2006 | Kikkawa | | H04L 29/06027 709/217 |
| 2007/0098017 A1 * | 5/2007 | Lundby | | H04W 52/16 370/474 |
| 2007/0233891 A1 * | 10/2007 | Luby | | H04L 69/14 709/231 |
| 2007/0268824 A1 * | 11/2007 | Kodaka | | H04L 12/24 370/229 |
| 2007/0268869 A1 * | 11/2007 | Lundby | | H04W 52/16 370/332 |
| 2008/0120404 A1 * | 5/2008 | Sakai | | H04L 41/0681 709/223 |
| 2008/0320160 A1 * | 12/2008 | Sitaraman | | H04L 29/06027 709/231 |
| 2009/0049496 A1 * | 2/2009 | Morton | | H04H 20/14 725/114 |
| 2009/0138618 A1 * | 5/2009 | Li | | H04L 67/1085 709/242 |
| 2009/0207839 A1 * | 8/2009 | Cedervall | | H04N 21/26616 370/390 |
| 2009/0300203 A1 * | 12/2009 | Virdi | | H04N 21/2358 709/231 |
| 2010/0103819 A1 * | 4/2010 | Samuels | | H04L 12/24 370/235 |
| 2010/0146108 A1 * | 6/2010 | Li | | H04L 67/1085 709/224 |
| 2011/0022682 A1 * | 1/2011 | Zanger | | H04L 41/0896 709/219 |
| 2012/0331160 A1 * | 12/2012 | Tremblay | | H04L 29/08702 709/228 |

* cited by examiner

METHOD, SYSTEM, AND APPARATUS FOR RECEIVING CONTENTS THROUGH MULTIPLE CHANNELS

CROSS-REFERENCE TO RELATED APPLICATION

This application claims the benefit of priority from the Korean Patent Application No. 10-2011-0113293, filed on Nov. 2, 2011 in the Korean Intellectual Property Office, the entire disclosure of which is incorporated herein by reference in its entirety.

BACKGROUND

1. Field

Exemplary embodiments broadly relate to a method and an apparatus for receiving contents through multiple channels, and more specifically, relate to a method and an apparatus for providing appropriate contents to a user device.

2. Description of the Related Art

As various mobile devices such as smart phones and tablet PCs have come into wide use, interest in a technique for providing multimedia contents to different devices such as TVs, smart phones, and tablet PCs has been increased.

Particularly, if a mobile device such as a smart phone and a tablet PC is provided with multimedia contents, it is not easy to apply a download and play scheme that enables a device to first download all multimedia contents and then start playing the downloaded multimedia contents to the mobile device due to its limit on a storage capacity. Therefore, such a mobile device can be provided with multimedia contents by a streaming scheme.

If the multimedia contents are provided by means of a streaming scheme, it is important to maintain a constant transmission rate of the contents for smooth playing. However, the multimedia contents are provided from a single contents server, the transmission rate may vary depending on a state of the contents server and a state of a network, and, thus, a steaming service may not be provided smoothly.

As prior art techniques concerning this, Korean Patent No. 0648659 describes a method of controlling a video transmission rate by calculating a video transmission rate capable of minimizing a cue delay and loss in video flow based on a forward delay time, a reverse delay time, a playback rate, and a bandwidth of a network during video streaming transmission and Korean Patent Laid-open Publication No. 2011-0015898 describes that each routing node monitors a link status with respect to adjacent routing nodes, detects a loss in a packet that contains video data, and controls a video transmission rate depending on the extent of the loss in the packet.

However, according to such prior art techniques, if contents received from multiple contents providing servers are transmitted by means of a streaming scheme, it is impossible to maintain a constant transmission rate of all contents.

SUMMARY

Accordingly, it is an aspect to provide a method and an apparatus capable of maintaining a constant contents transmission rate with respect to a user device by calculating a transmission rate depending on a state of each contents providing server and a state of a network, and by assigning data to be transmitted by each contents providing server if data of contents are received from multiple contents providing servers.

According to an aspect of exemplary embodiments, there is provided an apparatus for receiving contents through multiple channels. The apparatus includes a first manager configured to receive, from servers through the multiple channels, data related to contents which is suitable for a user device, and transmit the contents to the user device by using the received data and a second manager configured to set reference transmission rate ranges of each of the servers, wherein the first manager is further configured to receive the data from the servers based on the reference transmission rate ranges set by the second manager.

According to another aspect of exemplary embodiments, there is provided a method of receiving contents through multiple channels. The method includes receiving a request from a user device, determining contents which is suitable for the user device from among multiple contents corresponding to requested data, selecting servers from among a plurality of servers, the selected servers having all or a part of the contents, setting reference transmission rate ranges of each of the selected servers, receiving the requested data related to the contents from the servers based on the set reference transmission rate ranges and transmitting the contents to the user device by using the received data.

According to another aspect of an exemplary embodiment, there is provided an apparatus for receiving contents through multiple channels. The apparatus may comprise: a first manager configured to receive, from servers through the multiple channels, data which is suitable for a user device, and transmit the data to the user device; and a second manager configured to set reference transmission rate ranges of each of the servers, wherein the first manager receives the data from the servers based on a reference transmission rate range of at least one server.

According to yet another aspect of exemplary embodiments, there is provided a system for providing contents through multiple channels. The system may comprise: two or more servers which provide data to a user device, contents of the data being based on the user device; and an apparatus which receives the data from the two or more servers, transmits the data to the user device, and assigns an amount of the data to transmit, to the two or more servers, respectively, based on a reference transmission rate range of one of the two or more servers.

In exemplary embodiments, if data of contents are received from multiple contents providing servers, a transmission rate of each contents providing server is calculated and a transmission rate of each contents providing server is controlled based on a real transmission rate that is an actual transmission rate of each contents providing server and a reference transmission rate. Therefore, it is possible to maintain a constant contents transmission rate with respect to a user device.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Hereinafter, exemplary embodiments will be described in detail with reference to the accompanying drawings in order to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the entire document.

Throughout the entire document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Hereinafter, exemplary embodiments will be explained in detail by reference to the accompanying drawings.

Figure 1:
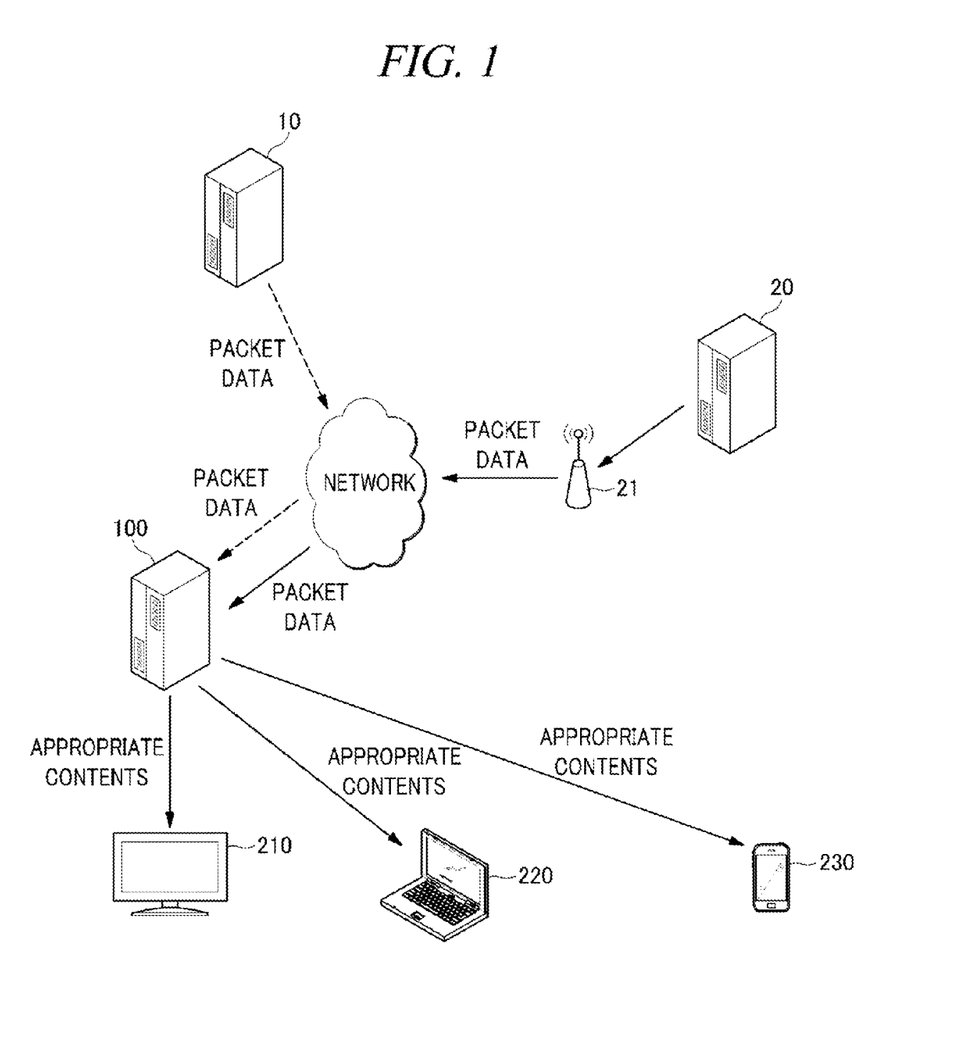
FIG. 1 is a view illustrating a configuration of a contents receiving system according to an exemplary embodiment.

FIG. 1 is a view illustrating a configuration of a contents receiving system according to an exemplary embodiment.

In an exemplary embodiment, a contents transmission management apparatus 100 receives a request for providing specific multimedia contents, for example, a video streaming service, from user devices 210 to 230.

The contents transmission management apparatus 100 searches for multiple contents providing servers that contains appropriate contents which is appropriate for the user device 210 in response to the multimedia contents providing request received from the user device 210.

The user devices 210 to 230 may include a smart phone, a Portable Multimedia Player (PMP), a Personal Digital Assistant (PDA), an Internet Protocol Television (IPTV), and a smart TV. A contents form, such as resolution and an encoding format, appropriate for a user device may vary depending on a kind of a user device.

Therefore, if the user device 210 requests multimedia contents, the contents transmission management apparatus 100 determines the fit contents which is appropriate for the user device 210 corresponding to the requested multimedia contents and searches for multiple contents providing servers 10 and 20, which contain the determined fit contents, from many contents servers matched with the contents transmission management apparatus 100.

The contents transmission management apparatus 100 sets reference transmission rate ranges for each of the searched contents providing servers 10 and 20. Herein, the reference transmission rate ranges are suitable for each of the contents providing servers 10 and 20 to transmit multiple packet data related to the appropriate contents.

The reference transmission rate ranges may be set based on at least one from among hardware specifications of each of the contents providing servers 10 and 20 and a state of a network.

The contents transmission management apparatus 100 assigns the amount of the multiple packet data belonging to the appropriate contents to each of the contents providing servers 10 and 20 depending on the calculated reference transmission rates.

That is, the contents transmission management apparatus 100 determines which contents providing server transmits which one of the multiple packet data to the contents transmission management apparatus 100.

By way of example, if a ratio of the reference transmission rate of the first contents providing server 10 to the reference transmission rate of the second contents providing server 20 is about 2:1, the contents transmission management apparatus 100 may assign packet data to the first contents providing server 10 and the second contents providing server 20 such that a ratio of the amount of packet data to be transmitted by the first contents providing server 10 to the amount of packet data to be transmitted by the second contents providing server 20 becomes about 2:1.

The contents transmission management apparatus 100 may receive the multiple packet data belonging to the appropriate contents from the first contents providing server 10 and the second contents providing server 20, and transmit the appropriate contents to the user device 230 by using the received multiple packet data.

The contents transmission management apparatus 100 may transmit the appropriate contents to the user device 210 by means of a streaming scheme. The contents transmission management apparatus 100 may receive all or a part of the appropriate contents from the first contents providing server 10 and the second contents providing server 20 and transmit them to the user device 210 by means of a streaming scheme.

The contents transmission management apparatus 100 measures real transmission rates of the first contents providing server 10 and the second contents providing server 20. If the measured real transmission rate is out of the set reference transmission rate range, the reference transmission rate range of each contents providing server is recalculated or a real transmission rate of the contents providing server is controlled to be fall within the reference transmission rate range, so that each contents providing server can maintain a appropriate transmission rate.

Figure 2:
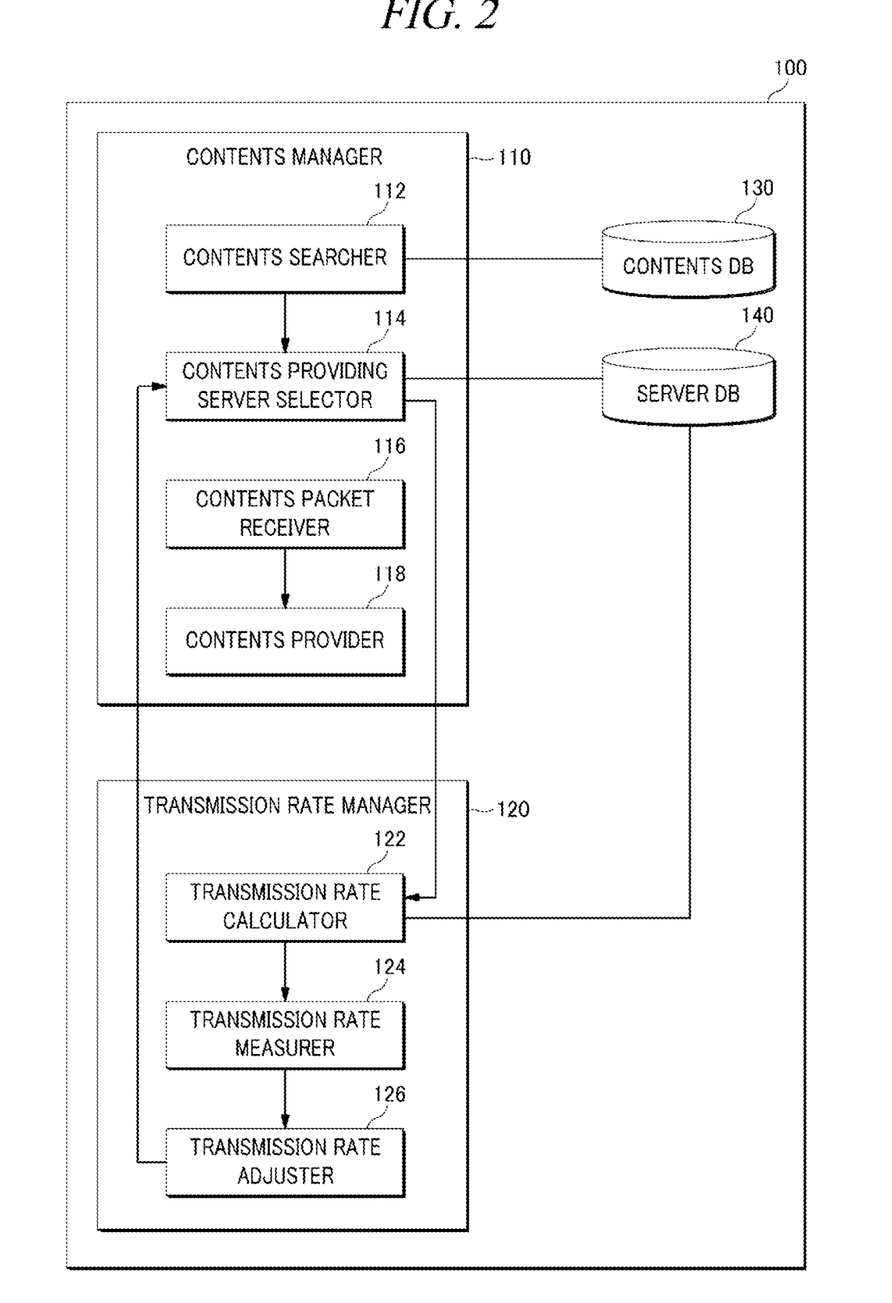
FIG. 2 is a block diagram illustrating a contents transmission management apparatus according to an exemplary embodiment.

FIG. 2 is a block diagram illustrating a contents transmission management apparatus according to an exemplary embodiment.

The contents transmission management apparatus 100 according to an exemplary embodiment includes a contents manager 110, a transmission rate manager 120, a contents database 130, and a server database 140.

The contents manager 110 searches for appropriate contents appropriate for a user device that requests multimedia contents and selects multiple contents providing servers that contain the searched appropriate contents.

The contents manager 110 receives multiple packet data belonging to the appropriate contents from the selected contents providing servers and transmits the appropriate contents to the user device (not illustrated) by using the received multiple packet data.

The contents manager 110 may transmit the appropriate contents to the user device by means of a streaming scheme. Therefore, even if the contents manager 110 does not receive packet data for all the appropriate contents but receives packet date for a part of the appropriate contents, the contents manager 110 may transmit the packet data for the part of the appropriate contents to the user device by means of a streaming scheme.

The contents manager 110 according to an exemplary embodiment includes a contents searcher 112, a contents providing server selector 114, a contents packet receiver 116, and a contents provider 118.

The contents searcher 112 searches for appropriate contents, which is appropriate for a hardware specification of the user device that requests multimedia contents, from the contents database 130 that contains contents information.

As described above, there may be multiple contents files that contain the same multimedia contents. Each of the multiple contents files has different specifications, such as resolution, frame rates, coding means, for the same multimedia contents. Therefore, the contents searcher 112 searches for the appropriate contents that contain the multimedia contents requested by the user device and are appropriate for the hardware specification of the user device.

The contents providing server selector 114 searches for many contents providing servers that contains the searched appropriate contents from the server database 140 and selects multiple contents providing servers from the many contents providing servers.

That is, the contents providing server selector 114 searches for lots of contents providing server as a contents server that contains the appropriate contents searched by the contents searcher 112 by using server information contained in the server database 140 and selects the contents server that contains the appropriate contents as the contents providing server.

The contents packet receiver 116 receives multiple packet data belonging to the appropriate contents from the multiple contents providing servers selected by the contents providing server selector 114.

The appropriate contents may contain multiple packet data and the contents packet receiver 116 may receive a part of multiple packet data not from a single contents providing server but from multiple contents providing servers.

By way of example, the contents packet receiver 116 receives packet data constituting a part of the appropriate contents from a first contents providing server and packet data constituting another part of the appropriate contents from a second contents providing server.

The contents provider 118 may provide the appropriate contents to the user device that requests multimedia contents by using the multiple packet data received by the contents packet receiver 116.

As described above, the contents provider 118 may transmit the appropriate contents to the user device by means of a streaming scheme. Therefore, even if the multiple packet data received by the contents packet receiver 116 does not constitute all of the appropriate contents but constitutes a part thereof, the contents provider 118 may transmit the part of the appropriate contents to the user device by means of a streaming scheme.

The transmission rate manager 120 manages transmission rates of multiple contents providing servers selected by the contents manager 110.

That is, the transmission rate manager 120 sets the reference transmission rate range for transmitting packet data of each of the contents providing servers, and if the real transmission rate that is an actual transmission rate for transmitting packet data by each contents providing server does not fall within the reference transmission rate range, the reference transmission rate or a real transmission rate that is to be measured next may be adjusted.

The transmission rate manager 120 according to an exemplary embodiment includes a transmission rate calculator 122, a transmission rate measurer 124, and a transmission rate adjuster 126.

The transmission rate calculator 122 calculates the reference transmission rate range of each contents providing server. The transmission rate calculator 122 may calculate the reference transmission rate range based on performance of each contents providing server and a state of the network.

The transmission rate measurer 124 measures the real transmission rate of each contents providing server. Herein, the real transmission rate is an actual transmission rate for transmitting packet data by each contents providing server.

The real transmission rate of a contents providing server may vary depending on the state of the network between each of the contents providing servers and the contents transmission management apparatus 100.

The transmission rate adjuster 126 compares the reference transmission rate range calculated by the transmission calculator 122 with the real transmission rate measured by the transmission rate measurer 124 and determines whether or not the real transmission rate of the contents providing server falls within the reference transmission rate range. The reference transmission rate or the real transmission rate may be adjusted depending on a result of the determination.

That is, the transmission rate adjuster 126 compares the reference transmission rate range of each contents providing server with the real transmission rate thereof and adjusts a real transmission rate that is to be measured next of each contents providing server or adjusts the reference transmission rate range of each contents providing server depending on a result of the comparison.

The adjustment of a real transmission rate that is to be measured next or the reference transmission rate by the transmission rate adjuster 126, will be explained in detail later with reference to FIG. 4.

Figure 3:
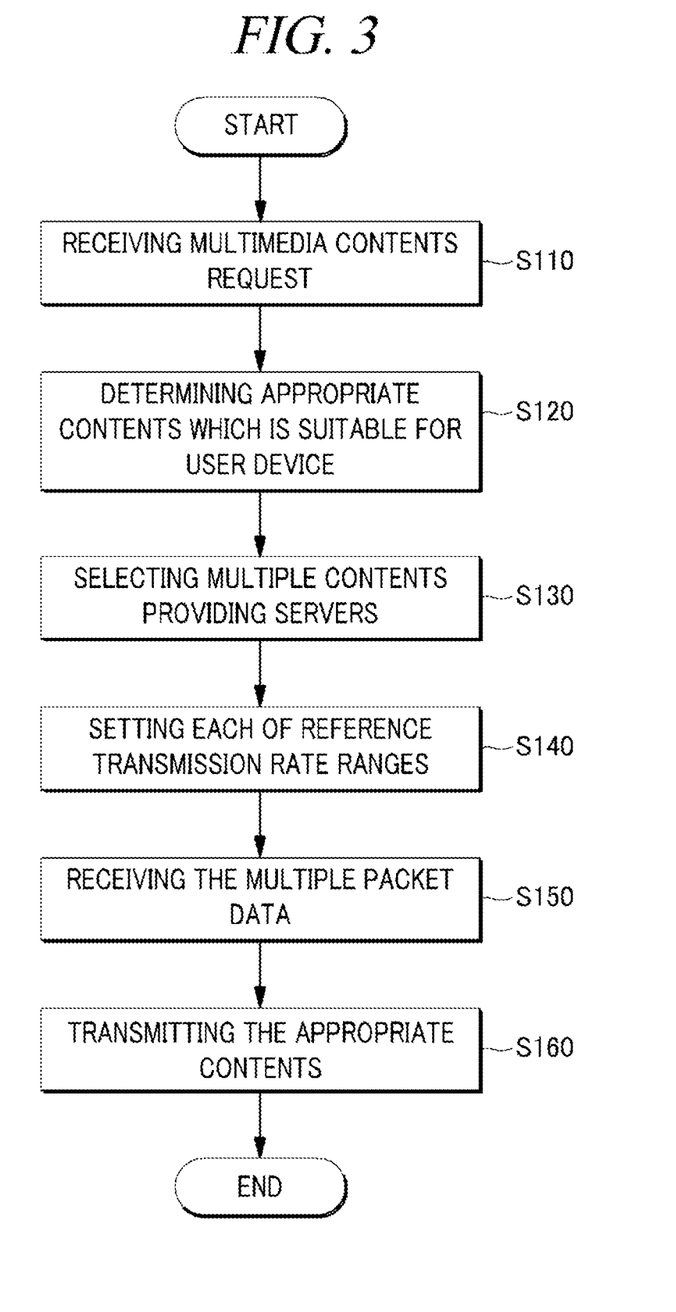
FIG. 3 is a flow diagram illustrating a contents receiving method according to an exemplary embodiment.

FIG. 3 is a flow diagram illustrating a contents receiving method according to an exemplary embodiment.

In operation S110, a contents transmission management apparatus 100 receives a request for multimedia contents from a user device.

In operation S120, the contents transmission management apparatus 100 determines appropriate contents, corresponding to the multimedia contents requested in operation S110, which is suitable for the user device.

In operation S130, the contents transmission management apparatus 100 selects multiple contents providing servers that contain all or a part of the appropriate contents determined in operation S120 from among many contents providing servers.

In operation S140, the contents transmission management apparatus 100 sets each of reference transmission rate ranges of each of the multiple contents providing servers selected in operation S130. The contents transmission management apparatus 100 calculates the reference transmission rate range of each contents providing server by using hardware specification information of each contents providing server, state information of the network, and the like. The reference transmission rate range set by the contents transmission management apparatus 100 may include an upper reference transmission rate and a lower reference transmission rate.

The contents transmission management apparatus 100 assigns packet data to be transmitted by each of the contents providing servers to the contents transmission management apparatus 100, to each of the contents providing servers based on the set reference transmission rate ranges. That is, the contents transmission management apparatus 100 assigns the amount of packet data belonging to the appropriate contents to be transmitted by each of the contents providing servers to the contents transmission management apparatus 100 based on the set reference transmission rate range.

In operation S150, the contents transmission management apparatus 100 receives the multiple packet data assigned to each of the contents providing servers in operation S140 from each of the contents providing servers.

In operation S160, the contents transmission management apparatus 100 regenerates a part or all of the appropriate contents by using the packet data received in operation S150 and transmits the regenerated appropriate contents to the user device by means of a streaming scheme. By way of example, the contents transmission management apparatus 100 generates video frames of the appropriate contents by using the packet data received in operation S150 and transmits the generated video frames to the user device to provide a streaming service of the requested multimedia contents to the user device.

Figure 4:
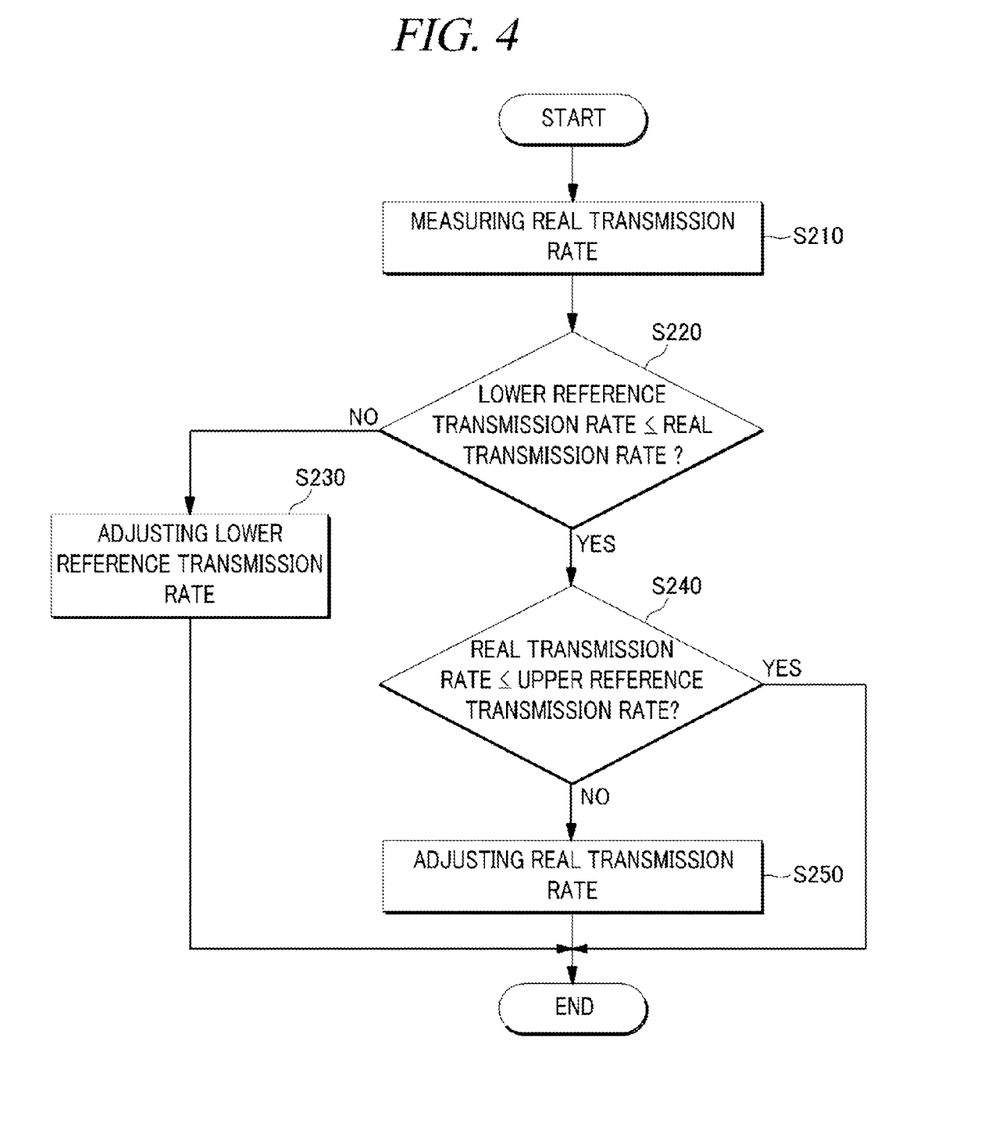
FIG. 4 is a flow diagram illustrating a method of adjusting a transmission rate according to an exemplary embodiment.

FIG. 4 is a flow diagram illustrating a method of adjusting a transmission rate according to an exemplary embodiment.

In operation S210, the contents transmission management apparatus 100 measures real transmission rates of each of the multiple contents providing servers that transmit packet data related to the appropriate contents, to the contents transmission management server.

In operation S220, the contents transmission management apparatus 100 compares the real transmission rate measured in operation S210 with a lower reference transmission rate included in a pre-calculated reference transmission rate of the corresponding contents providing server and determines whether or not the measured real transmission rate is equal to or greater than the lower reference transmission rate.

In operation S230, if it is determined that the real transmission rate measured in operation S210 is smaller than the lower reference transmission rate in operation S220, the contents transmission management apparatus 100 recalculates the reference transmission rate ranges of each of the contents providing servers that transmit packet data to the contents transmission management apparatus 100 to adjust the reference transmission rate ranges of each of the contents providing servers.

That is, if it is determined that the real transmission rate measured in operation S210 of any one of the contents providing servers is smaller than a lower reference transmission rate of the reference transmission rate range, the contents transmission management apparatus 100 adjusts the reference transmission rate ranges of all the contents providing servers, so that the amount of the packet data can be reassigned to the contents providing servers. Thus, even if a packet data transmission rate of any one of the contents providing servers is decreased, it is possible to prevent an error in a streaming service provided to the user device.

In operation S240, if it is determined that the real transmission rate measured in operation S210 is equal to or greater than the lower reference transmission rate in operation S220, the contents transmission management apparatus 100 compares the real transmission rate measured in operation S210 with an upper reference transmission rate included in the pre-calculated reference transmission rate of the corresponding contents providing server and determines whether or not the measured real transmission rate is equal to or smaller than the upper reference transmission rate.

In operation S250, if it is determined that the real transmission rate measured in operation S210 is greater than the upper reference transmission rate in operation S240, the contents transmission management apparatus 100 adjusts a real transmission rate, that is to be measured next, of the corresponding contents providing server so as to be fall within the reference transmission rate range of the corresponding contents providing server. The contents transmission management apparatus 100 can adjust the real transmission rate, that is next to be measured, regardless of an increase in the transmission rate of the corresponding contents providing server.

In this way, the contents transmission management apparatus 100 adjusts a receiving rate of the contents transmission management apparatus 100 for the appropriate contents to corresponds to a reproduction rate of the user device for the appropriate contents by adjusting the real transmission rate, that is next to be measured, of each contents providing server.

If the real transmission rate measured in operation S210 of each contents providing server is greater than the upper reference transmission rate, the contents transmission management apparatus 100 receives, from the contents providing server, packet data more than necessary to be transmitted to the user device after a certain amount of time. Thus, overflow may occur at a buffer of the contents transmission management apparatus 100 or the user device.

If the real transmission rate measured in operation S210 of each contents providing server is smaller than the lower reference transmission rate, the user device cannot receive video frames to be played and a streaming service may be stopped.

Therefore, the contents transmission management apparatus 100 can adjust the real transmission rate, that is next to be measured, of each contents providing server to correspond to the reproduction rate of the user device for the appropriate contents.

Figure 5:
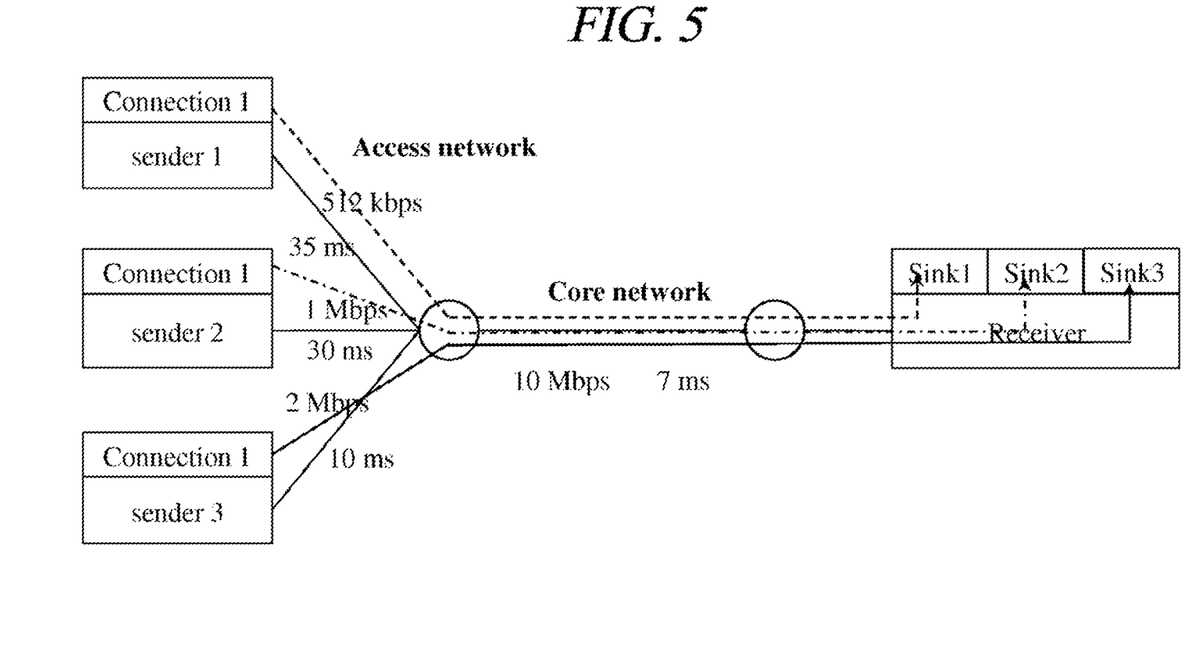
FIG. 5 illustrates a result of an experiment in which topology is applied to a contents receiving system according to an exemplary embodiment.

FIG. 5 illustrates a result of an experiment in which topology is applied to a contents receiving system according to an exemplary embodiment.

An experiment result of FIG. 5 shows a case where the same appropriate contents is received from three connecting links and played. In this case, a reproduction rate is set to about 3 Mbps and in order to vary a state of a network, the state of the network is deteriorated by adding background TCP traffic to a first link (about 512 kbps) during a time period from about 10 seconds to about 30 seconds, a second link (about 1 Mbps) during a time period from about 40 seconds to about 60 seconds, and a third link (about 2 Mbps) during a time period from about 70 seconds to about 90 seconds, so that reliability can be checked.

It can be seen from the experiment result of the contents receiving system according to an exemplary embodiment that it is possible to reduce the number of video frames received by a user device later than a contents play time of the user device and also possible to maintain a constant transmission rate regardless of a load at a network.

Figure 6:
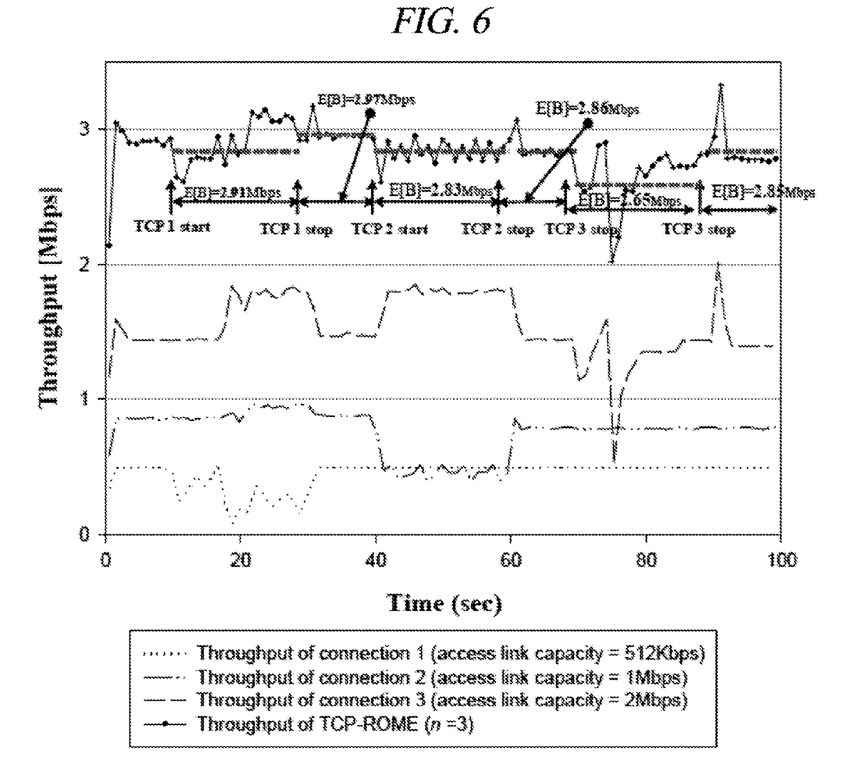
FIG. 6 illustrates variations in transmission rate of an entire apparatus depending on a decrease in transmission rate of a specific link in a contents receiving system according to an exemplary embodiment.

FIG. 6 illustrates variations in transmission rate of an entire apparatus depending on a decrease in transmission rate of a specific link in a contents receiving system according to an exemplary embodiment.

As depicted in FIG. 6, it can be seen that although the state of the network is deteriorated due to the background traffic, the transmission rate can be maintained at about 3 Mbps overall.

Figure 7A:
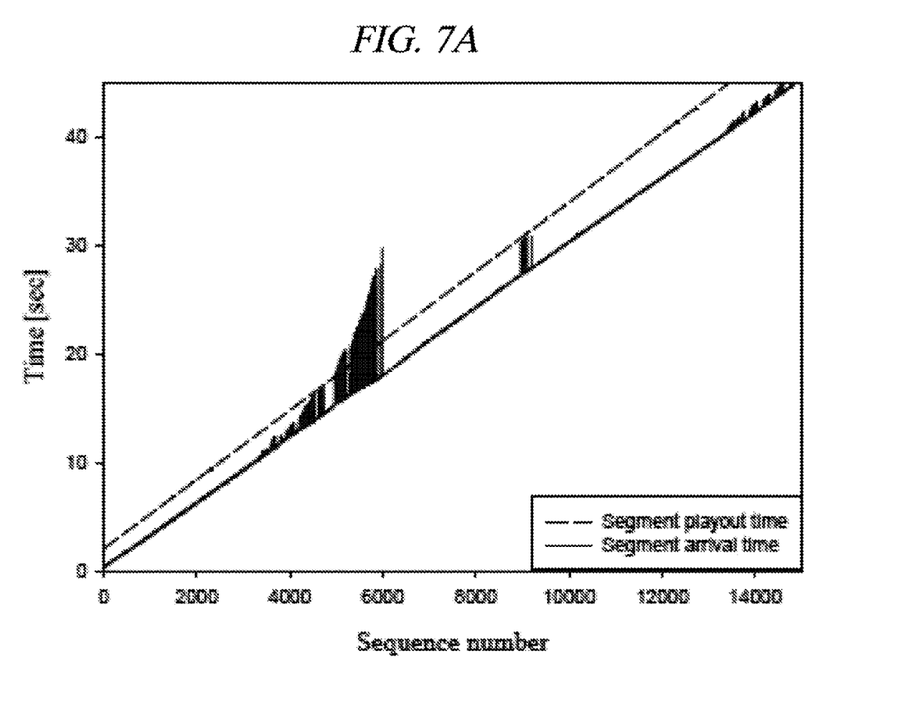
FIGS. 7A and 7B illustrate variations in a video frame receiving point depending on a decrease in transmission rate of a specific link according to an exemplary embodiment.
Figure 7B:
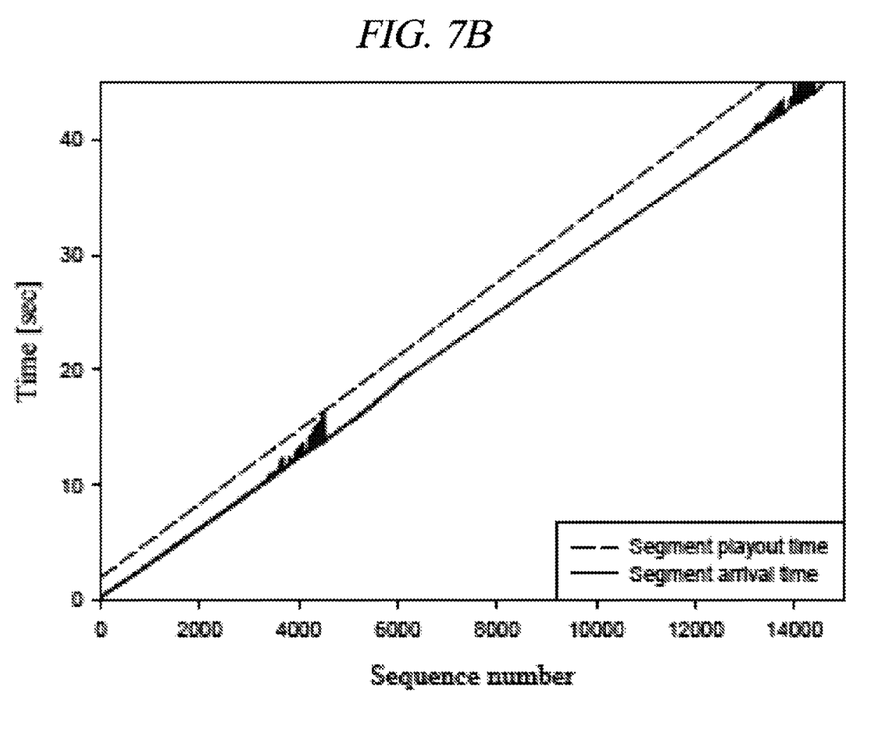

FIGS. 7A and 7B illustrate variations in a video frame receiving point depending on a decrease in transmission rate of a specific link according to an exemplary embodiment.

In FIGS. 7A and 7B, an X-axis represents a sequence number and a Y-axis represents time to show that video frames are received in sequence. Vertical lines in the graph represents that a sequence of the video frames is inverted. If the sequence of the video frames is inverted, videos cannot be transmitted continuously and the transmission may be stopped. In order to prevent this situation, a buffer of large capacity is needed.

FIG. 7A shows a case where the contents receiving system according to the exemplary embodiment is not employed and FIG. 7B shows a case where the contents receiving system according to the exemplary embodiment is employed. Referring to FIG. 7, it can be seen that if the contents receiving system according to the exemplary embodiment is employed, the contents transmission management apparatus 100 assigns a transmission amount of packet data constituting appropriate contents to an appropriate contents providing server depending on a state of a link, a state of a network, and the like, and the number of inverted video frames can be reduced.

The exemplary embodiment can be embodied in a storage medium including instruction codes executable by a computer such as a program module executed by the computer. Besides, the data structure according to exemplary embodiments can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of exemplary embodiments. It shall be understood that all modifications and embodiments conceived from the meaning and scope of the claims and their equivalents are included in the scope of the present disclosure.

What is claimed is:

1. An apparatus for receiving contents through multiple channels, the apparatus comprising:
    a first manager configured to receive, from at least two servers through the multiple channels, data related to contents which is suitable for a user device, and transmit the contents to the user device by using the received data; and
    a second manager configured to set reference transmission rate ranges of each of the at least two servers,
    wherein the first manager is further configured to receive the data from the at least two servers based on a ratio of the reference transmission rate ranges set by the second manager.

2. The apparatus of claim 1, wherein the first manager comprises:
    a searcher configured to search for the contents appropriate for a hardware specification of the user device;
    a selector configured to select, from among a plurality of servers, the at least two servers that have all or a part of the contents;
    a receiver configured to receive the data from the selected at least two servers; and
    a provider configured to transmit the contents to the user device by using the received data.

3. The apparatus of claim 1, wherein the second manager comprises:
    a calculator configured to calculate each reference transmission rate range of each of the at least two servers;
    a measurer configured to measure a real transmission rate of each of the at least two servers; and
    an adjuster configured to adjust one of the reference transmission rate range and a real transmission rate of each of the at least two servers by comparing at least one calculated reference transmission rate and at least one measured real transmission rate.

4. The apparatus of claim 3, wherein the adjuster is configured to respectively adjust the real transmission rates of each of the at least two servers to fall within the calculated reference transmission rate ranges of each of the at least two servers.

5. The apparatus of claim 3, wherein the reference transmission rate range comprises a lower reference transmission rate, and
    if the measured real transmission rate of a first server is smaller than the lower reference transmission rate of the first server, the adjuster is configured to adjust the lower reference transmission rate of the first server based on the real transmission rate of the first server.

6. The apparatus of claim 3, wherein the reference transmission rate range comprises an upper reference transmission rate, and
    if the measured real transmission rate of a first server is greater than the upper reference transmission rate of the first server, the adjuster is configured to adjust the real transmission rate of the first server to be equal to or smaller than the upper reference transmission rate of the first server.

7. A method of receiving contents through multiple channels, the method comprising:
    receiving a request from a user device;
    determining contents which is suitable for the user device from among multiple contents corresponding to requested data;
    selecting at least two servers from among a plurality of servers, the selected at least two servers having all or a part of the contents;

setting reference transmission rate ranges of each of the selected at least two servers;

receiving the requested data related to the contents from the selected at least two servers based on a ratio of the set reference transmission rate ranges; and transmitting the contents to the user device by using the received data.

8. The method of claim 7, wherein the receiving the requested data comprises:

measuring a real transmission rate of each of the at least two servers; and adjusting one of the reference transmission rate range and a real transmission rate of each of the multiple contents providing servers by comparing a calculated reference transmission rate of at least one of the selected at least two servers and the measured real transmission rate of the at least one of the selected at least two servers.

9. The method of claim 8, wherein the reference transmission rate range comprises a lower reference transmission rate, and if the measured real transmission rate of a first server is smaller than the lower reference transmission rate of the first server, adjusting the lower reference transmission rate of the first server.

10. The method of claim 8, wherein the reference transmission rate range comprises an upper reference transmission rate, and if the measured real transmission rate of a first server is greater than an upper reference transmission rate of the first server, adjusting the real transmission rate of the first server to be equal to or smaller than the upper reference transmission rate of the first server.

11. The method of claim 10, wherein the adjusting the real transmission rate comprises:

adjusting the real transmission rate to be equal to or smaller than the upper reference transmission rate by disregarding a real transmission rate increasing event of the first server.

12. An apparatus for receiving contents through multiple channels, the apparatus comprising:

a first manager configured to receive, from at least two servers through the multiple channels, data which is suitable for a user device, and transmit the data to the user device; and a second manager configured to set reference transmission rate ranges of each of the at least two servers, wherein the first manager receives the data from the at least two servers based on a ratio of the reference transmission rate ranges set by the second manager.

13. The apparatus of claim 12, wherein the reference transmission rate ranges of other servers are recalculated based on a reference transmission rate range of at least one from among the at least two servers.

14. The apparatus of claim 13, wherein the reference transmission range of the at least one from among the at least two servers comprises a lower reference transmission rate, and if an actual transmission rate of the at least one from among the at least two servers is lower than the lower reference transmission rate, lower reference transmission rates of the other servers are adjusted based on the actual transmission rate of the at least one from among the at least two servers.

15. The apparatus of claim 13, wherein the reference transmission range of the at least one from among the at least two servers comprises an upper reference transmission rate, and if an actual transmission rate of the at least one from among the at least two servers is greater than the upper reference transmission rate, actual transmission rates of the other servers are adjusted to be equal to or smaller than the upper reference transmission rate of the at least one from among the at least two servers.

16. A system for providing contents through multiple channels, the system comprising:

two or more servers which provide data to an apparatus, contents of the data being based on a user device; and the apparatus which receives the data from the two or more servers, assigns each of the two or more servers an amount of the data to transmit to the apparatus, based on a ratio of the reference transmission rate ranges of the two or more servers, and transmits the data to the user device.

17. The system of claim 16, wherein one of an actual rate of transmission of other servers and a reference transmission rate range of other servers is adjusted based on a reference transmission rate range of at least one of the two or more servers.

18. The system of claim 17, wherein the reference transmission range of the one of the two or more servers comprises a lower reference transmission rate, and if an actual transmission rate of the one of the two or more servers is lower than the lower reference transmission rate, lower reference transmission rates of the other servers are adjusted based on the actual transmission rate of the one of the two or more servers.

19. The system of claim 17, wherein the reference transmission range of the one of the two or more servers comprises an upper reference transmission rate, and if an actual transmission rate of the one of the two or more servers is greater than the upper reference transmission rate, actual transmission rates of the other servers are adjusted to be equal to or smaller than the upper reference transmission rate of the one of the two or more servers.

20. The system of claim 19, wherein the actual transmission rates of the other servers are adjusted regardless of a transmission increasing event occurring in the other servers.

* * * * *